Sept. 23, 1958
M. G. WALLING
2,852,893
MACHINE TOOL
Filed Sept. 29, 1955
2 Sheets-Sheet 1
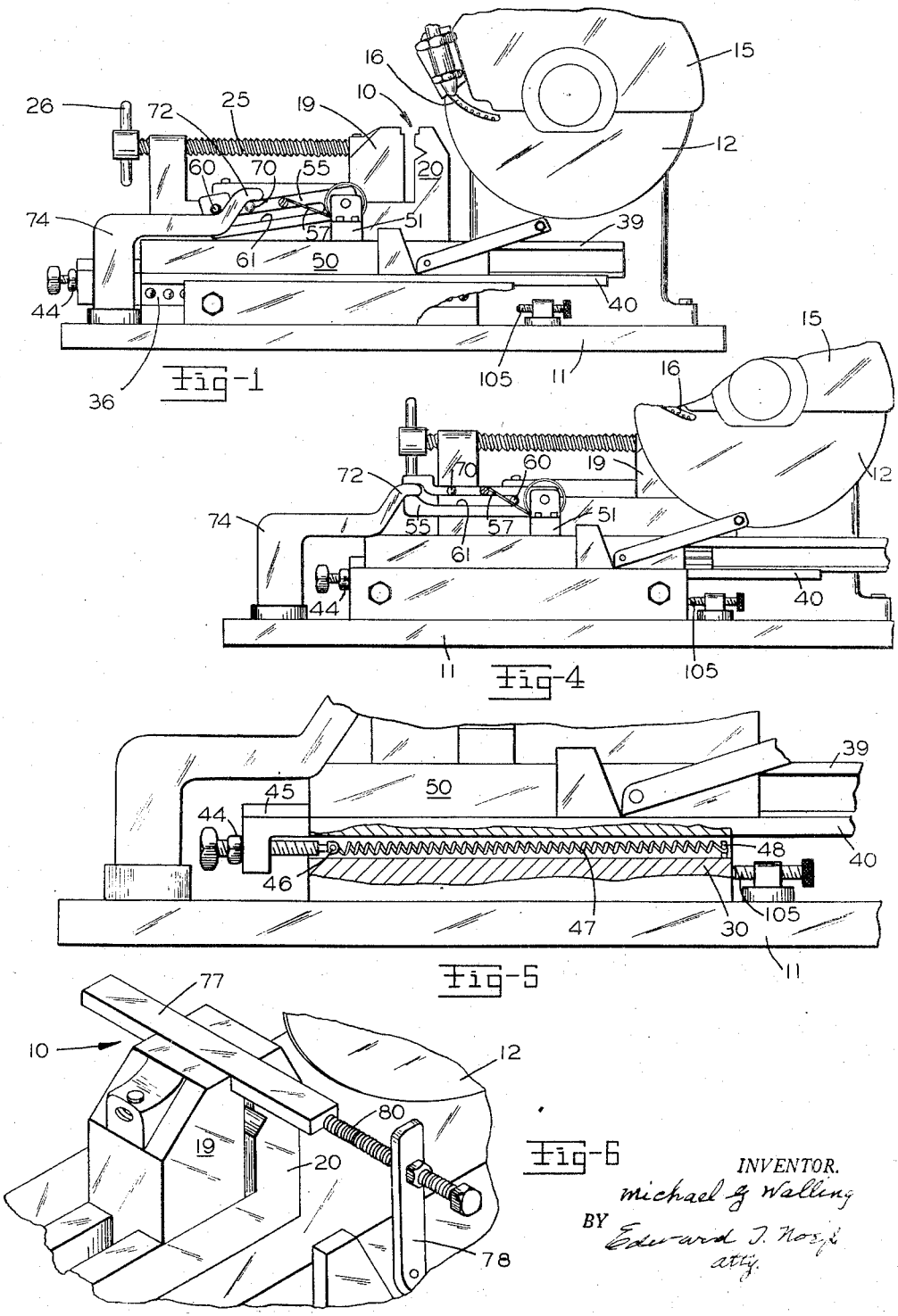

Sept. 23, 1958 M. G. WALLING 2,852,893
MACHINE TOOL
Filed Sept. 29, 1955 2 Sheets-Sheet 2
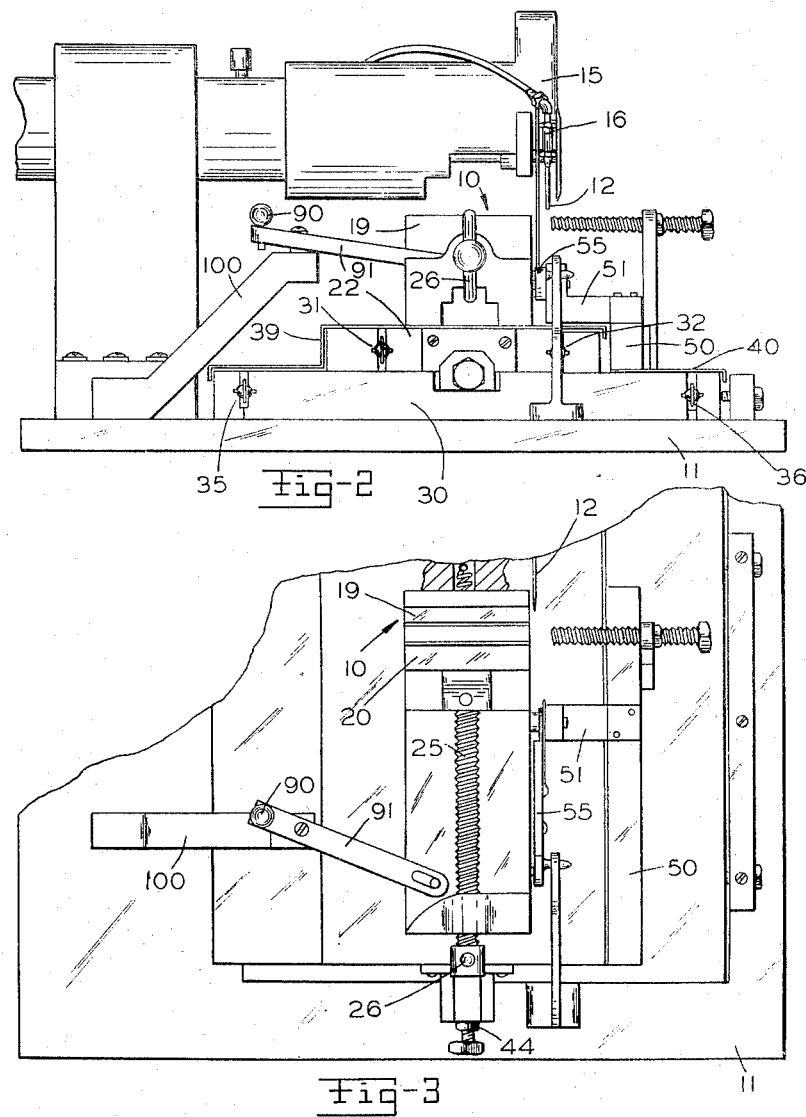
INVENTOR.
Michael G. Walling
BY Edward J. Noie
atty

United States Patent Office 2,852,893
Patented Sept. 23, 1958

2,852,893

MACHINE TOOL

Michael G. Walling, Dayton, Ohio, assignor, by mesne assignments, to The Sheffield Corporation, a corporation of Delaware Application September 29, 1955, Serial No. 537,396

7 Claims. (Cl. 51—92)

This invention relates to cutting devices.

In cutting hard materials such as hard carbide tool materials by means of a cutting disk of the diamond impregnated type or the like, the disk is easily chipped by engaging the work against disk with shock or burned by the application of excessive cutting pressure. Most efficient cutting is accomplished through constant cutting pressures of a magnitude dependent upon the particular application involved.

It is accordingly the primary object of this invention to provide a device for readily and efficiently cutting hard materials without damage to the cutting means or the work being cut.

It is a further object to provide such a device wherein the work and cutting means are initially engaged without shock and wherein a constant cutting pressure of the desired amount is maintained throughout the cutting operation.

It is a further object to provide such a device adaptable for cutting workpieces of a wide range of dimensions and including means for repeatedly cutting pieces to the same dimension as desired.

It is a further object to provide a cutting device having means for providing a constant cutting pressure, the cutting pressure being adjustable for the most efficient cutting as determined by work material, work dimension, disk diameter and material and like conditions.

Other objects and advantages will be apparent from the following description, the appended claims and the accompanying drawings, in which, Figure 1 is a side view, in elevation, of a cutting device embodying the present invention.

Figure 2 is an end view of the device,

Figure 3 is a fragmentary plan view of the device,

Figure 4 illustrates the device with the workholder in an advanced position having carried a workpiece past the cutting disk, Figure 5 is an enlarged fragment of Figure 4 shown in partial section, and Figure 6 is fragmentary view in perspective illustrating the mounting of a workpiece in the workholder of the device.

For illustrative purposes the present invention has been disclosed as embodied in a device for cutting extremely hard materials by means of an abrasive disk rotating at high speeds. In this invention the workpiece and disk are relatively engaged slowly and without shock to protect the disk against damage through chipping and the like. Provision is also made for maintaining a desired pressure between the workpiece and disk during cutting for the most efficient operation. The workpiece is first moved from a retracted position for easy loading forward into close proximity with the disk periphery through a comparatively rapid initial movement. Following this, a second movement is provided for moving the workpiece gradually and comparatively slowly into engagement with the disk and without shock. Adjustable resilient means are used in the illustrated device to maintain a cutting pressure as desired.

Referring more particularly to the drawings a workholder 10 is carried for movement along a base 11 toward and from a disk 12. Disk 12 is adapted to be driven at high speeds by an electric motor not shown. The disk is partially covered by a protective shield 15 and a perforated tube 16 is provided for supplying a liquid to the cutting zone.

Workholder 10 has adjustable jaws 19 and 20 forming a vise-like arrangement. Jaw 20 is fixed relative to a slideable support 22 (see Figure 1) while jaw 19 is adjustable along the support and toward and from jaw 20 through a screw arrangement 25 and adjusting handle 26.

Support 22 is mounted for movement along a carrier 30 toward and from disk 12 by means of ball ways 31 and 32. Carrier 30 is in turn supported for movement toward and from the disk along base 11 by ball ways 35 and 36. Shields 39 and 40 serve to protect the ways from the coolant flow and cutting debris. Support 22 has a rearward extension 45 into which is adjustably threaded and attachment 46 for a spring 47 which extends forwardly to a pin 48 fixed to carrier 30 (see Figure 5). Lock nut 44 maintains screw attachment 46 in its adjusted positions.

An elongated member 50 fixed to and extending along carrier 30 immediately above the inner end of shield 40 mounts a pedestal 51 which pivotally supports a latching arm 55 used in latching workholder 10 and support 22 to carrier 30. Latching arm 55 is biased in a counter-clockwise direction as seen in Figure 1 by means of a coil spring 57 having one end fixed to pedestal 51. A latching pin 60 extends from workholder 10 and projects into a slot 61 formed in arm 55. It will be seen that when arm 55 is rotated downwardly as in Figure 1 pin 60 is in an upper portion of slot 61 and the workholder is latched against movement toward disk 12 on the carrier 30 under the resilience of spring 47. A handle 70 extending from latching arm 55 serves to raise and lower it for latching and unlatching purposes. A safety 72 formed as part of an extended arm 74 mounted on base 11 maintains handle 70 in a downward position when both the carrier 30 and workholder support are retracted to prevent inadvertent movement of the workholder 10 toward disk 12 from this position with possible resulting damage to the disk.

The workholder in its retracted position as shown in Figure 1 is positioned to be easily accessible and so the jaws can be readily opened to receive a workpiece for cutting. As seen in Figure 6 jaws 19 and 20 are closed against a workpiece 77. A swingable arm 78 pivoted on the carrier 30 includes an adjustable stop screw 80 which can be swung upward. The workpiece 77 can be extended against the stop to gage the workpiece so that pieces of the same length can be repeatedly cut.

As an initial movement following tightening of jaws 19 and 20 about the workpiece a knob 90 fixed to the outer end of a lever 91 pivoted on a support 100 is swung in a counter-clockwise direction as viewed in Figure 3 to carry the workholder 10 and carrier 30 together in a latched condition forward toward disk 12. This movement is limited by an adjustable stop 105 positioned to engage the carrier at a desired inward position where the workpiece is in close proximity to the periphery of the disk but not in contact therewith. During this movement latching arm 55 is maintained in its downward position by coil spring 57 so that workholder 10 is maintained in a latched position on carrier 30.

Slot 61 has a straight portion adjacent the axis of pivoting and an upwardly curved portion at its other end. To engage the workpiece with the disk 12 in a gradual manner and without shock the operator grasps handle 70 on latching arm 55 and raises it. The curved outer portion of slot 61 serves to control the movement of and give a slow initial movement and release of workholder 10. Following engagement of the workpiece with the disk 12 cutting pressure between the workpiece and disk is maintained through spring 47 as pin 60 moves along slot 61. Carrier 30 is maintained against stop 105, in this embodiment of the invention, by the guiding and supporting ways. In Figure 4 the device is shown with the components in the relative position they occupy following completion of a cutting operation with workholder 10 having moved inward past disk 12 to a position limited by the engagement of pin 60 with the inner end of slot 61 in latching arm 55. Through the adjustment for the tension of spring 47 the cutting pressure can be maintained constant and of a magnitude as necessary for each particular operation.

When cutting has been completed lever 91 is rocked in the reverse direction by the operator, first retracting the work holder 10 from the disk 12. As the workholder begins its initial rearward movement pin 60 moves along slot 61 until it reaches the curved portion thereof. At that time spring 57 forces latching arm 55 downward and the workholder is latched automatically to carrier 30. As lever 91 is swung further workholder 10 and carrier 30 are both retracted to their rearward positions, disposing the workholder so that it is readily accessible for removal of the work previously cut.

Thus it is seen that a device has been provided for use in cutting extremely hard materials wherein the workpiece and cutting disk are moved rapidly toward one another to an initial limited position with the work piece adjacent the disk periphery, following which the workpiece is comparatively slowly moved to engage the disk without shock. Provision has been made for maintaining a cutting force of a magnitude as desired. The entire device is simply constructed of rugged components for useful service in repeated cutting operations.

While the form of apparatus herein described constitutes a preferred embodiment of the invention it is to be understood that the invention is not limited to this precise form of apparatus, and that changes may be made therein without departing from the scope of the invention which is defined in the appended claims.

What is claimed is:

1. A cutting device comprising a base, a cutting disk, means carrying said disk from said base for rotation, a workholder movable on said base toward and from said disk, manually actuated means for comparatively rapidly advancing said workholder from a retracted position toward the disk to arrange the work near the disk, and additional controllable means cooperating with said workholder for comparatively slowly moving the workholder through the remaining displacement and engaging the workpiece and disk without shock, and adjustable means for maintaining a constant cutting pressure between the workpiece and said disk following engagement and during a cutting operation.

2. A cutting device comprising a base, a cutting disk, means carrying said disk from said base for rotation, a carrier supported on said base for movement toward and from said disk, a workholder mounted on said carrier for movement relative thereto toward and from said disk, resilient means cooperating between said workholder and said carrier for urging said workholder relative to said carrier toward said disk, latch means cooperating between said workholder and said carrier, means for moving said carrier and said workholder to position a workpiece adjacent the disk periphery, said latch means including manually actuated means for controlling movement of said workholder relative to said carrier and gradually engaging the workpiece with the disk periphery, said resilient means serving to maintain a constant cutting pressure between said disk and the work during a cutting operation.

3. A cutting device comprising a base, a cutting disk, means carrying said disk from said base for rotation, a carrier supported on said base for movement toward and from said disk, a workholder mounted on said carrier for movement relative thereto toward and from said disk, resilient means cooperating between said workholder and said carrier for urging said workholder relative to said carrier toward said disk, latch means for locking the workholder against movement toward said disk relative to said carrier, manually actuated means for moving said workholder and carrier toward and from the disk periphery, stop means on said base for engaging said carrier and limiting the movement of the carrier and workholder together toward the disk to position a workpiece adjacent the disk periphery, said latch means including cam means for gradually releasing said workholder relative to said carrier and moving the workpiece into engagement with the disk without shock, said resilient means serving to maintain a constant cutting pressure during the cutting operation.

4. A cutting device comprising a base, a disk, means carrying said disk from said base for rotation, a carrier supported on said base for movement toward and from said disk, a workholder supported on said carrier for movement relative thereto toward and from said disk, resilient means cooperating between said workholder and said carrier urging said workholder relative to said carrier toward the disk periphery, latch means cooperating between said workholder and said carrier, manually actuated means on said base for moving said workholder and said carrier toward said disk in a latched condition for positioning a workpiece adjacent the disk periphery, stop means on said base for engaging said carrier and limiting its movement toward the disk, said latch means being manually releasable and including means for gradually engaging the workpiece with the disk without shock after the carrier has been positioned inwardly, and safety means on said base cooperating with said latch means and preventing the release of said latch means while the carrier and workholder are positioned rearwardly, said resilient means serving to maintain a constant cutting pressure between the workpiece and disk during a cutting operation following the release of the latch means.

5. A cutting device comprising a base, a disk, means carrying said abrasive disk from said base for rotation, a carrier supported on said base for movement toward and from said abrasive disk, a workholder supported on said carrier for movement relative thereto toward and from said disk, resilient means cooperating between said workholder and said carrier urging said workholder towards said disk relative to said carrier, releasable latch means for preventing relative movement between said workholder and said carrier, manually actuated means on said base cooperating with said workholder for moving said workholder and said carrier together in a latched condition forward toward said disk, stop means for engaging said carrier and limiting its forward movement to position a workpiece adjacent the disk periphery, said latch means including means for gradually releasing the workholder to engage the workpiece with the disk periphery without shock, the resilient means serving to maintain a constant cutting pressure between the workpiece and disk during a cutting operation, the manually actuated means serving to retract said workholder from the disk periphery following the completion of a cutting operation, resilient means urging said latch means into a latched position after a given rearward movement of the workholder and safety means cooperating with said latch means preventing the release thereof while the carrier and workholder are positioned rearwardly and away from the disk periphery.

6. A cutting device comprising a base, a cutting disk, means carrying said disk from said base for rotation, a carrier supported on said base for movement toward and from said disk, a workholder mounted on said carrier for movement relative thereto toward and from said disk, resilient means cooperating between said workholder and said carrier for urging said workholder relative to said carrier toward said disk, retaining means between said workholder and carrier acting in opposition to said resilient means, means for moving said carrier and said workholder from a retracted position forward toward the disk, limit means on said base cooperating with said carrier for limiting the forward movement to position a workpiece adjacent the disk periphery, said retaining means including releasable means for then freeing said workholder for movement relative to said carrier, whereby the workpiece is maintained in engagement with said disk under urging of said resilient means during cutting.

7. A cutting device comprising a base, a cutting disk, means carrying said disk on said base for rotation, a workholder movably supported on said base for carrying a workpiece into engagement with the disk, manually actuated means operatively connected to said workholder for movement thereof from a retracted position forward to position a workpiece adjacent the periphery of said cutting disk, resilient means cooperating between said workholder and said base, controllable means for then applying said resilient means to yieldingly urge said workpiece into engagement with the cutting disk during a cutting operation, and safety means for disabling said controllable means when the workholder is in the retracted position, whereby said workholder cannot move from its full retracted position into engagement with said disk under force of said resilient means.

References Cited in the file of this patent

UNITED STATES PATENTS

| | | |
|---|---|---|
| 242,221 | Quinn | May 31, 1881 |
| 273,632 | Strong | Mar. 6, 1883 |
| 702,098 | Hemming | June 10, 1902 |
| 767,383 | Buck | Aug. 16, 1904 |
| 1,395,163 | Tatosian | Oct. 25, 1921 |